United States Patent [19]

Hoyle

[11] 4,166,203
[45] Aug. 28, 1979

[54] ELECTRICAL SWITCH

[75] Inventor: Brian Hoyle, Nelson, England

[73] Assignee: Lucas Industries Limited, Birmingham, England

[21] Appl. No.: 870,093

[22] Filed: Jan. 17, 1978

[30] Foreign Application Priority Data

Jan. 21, 1977 [GB] United Kingdom ............. 2609/77

[51] Int. Cl.² .................................................. H01H 3/16
[52] U.S. Cl. .................................................. 200/61.27
[58] Field of Search ............... 200/153 H, 252, 335, 200/61.27, 61.28, 61.3, 157

[56] References Cited

U.S. PATENT DOCUMENTS

| | | | |
|---|---|---|---|
| 3,511,943 | 5/1970 | Kibler | 200/61.27 X |
| 3,603,748 | 9/1971 | Cryer | 200/61.27 X |
| 3,671,691 | 6/1972 | Suzuki et al. | 200/61.27 X |
| 3,859,489 | 1/1975 | Tomlinson | 200/61.27 X |
| 3,996,433 | 12/1976 | Suzuki et al. | 200/61.27 |

FOREIGN PATENT DOCUMENTS 1031759  6/1966  United Kingdom .

*Primary Examiner*—Steven M. Pollard
*Attorney, Agent, or Firm*—Holman & Stern

[57] ABSTRACT

An electrical switch of the kind known as a stalk mounted switch wherein the body includes a sleeve which is freely slidable on the stalk and which, for the purposes of simple assembly of the switch, has an internal diameter such, in relation to the dimension of the supporting stalk, that the sleeve could be disengaged from the free end of the stalk. An abutment component is provided within the body and co-operates with a second abutment component on the stalk to prevent such disengagement of the body from the stalk.

6 Claims, 14 Drawing Figures

ELECTRICAL SWITCH

This invention relates to an electrical switch of the kind to be referred to herein as a stalk mounted switch, and comprising an elongate hollow stalk which defines, in use, the operating member of, for example, a further electrical switch, a hollow body slidable on the stalk lengthwise thereof, electrical contacts operable by movement of the hollow body relative to the stalk, resilient means urging the body longitudinally of the stalk in a direction to move the body clear of the free end of the stalk and abutment means preventing the body being moved sufficiently far to disengage the body from the free end of the stalk in the direction of the action of said resilient means.

In a known form of switch of the kind specified the electrical contacts comprise a bridging contact movable with the hollow body and a fixed contact arrangement secured to the free end of the stalk. The fixed contact arrangement includes first and second fixed contacts electrically insulated from one another by a moulded synthetic resin block secured to the free end of the stalk. The stalk is hollow and conductive, the first fixed contact being electrically connected to the stalk and the second fixed contact being electrically connected to the core of a lead which extends through the hollow stalk. In use, the movable contact can be moved to bridge the first and second fixed contacts. The abutment means comprises respective surfaces on the hollow body and a carrier forming part of the fixed contact arrangement. Thus the body must be engaged on the stalk and moved along the length of the stalk to expose the free end thereof prior to securing the fixed contact arrangement to the free end of the stalk. Not only is the operation of securing the fixed contact arrangement to the stalk hampered by the presence of the hollow body but also the stalk must be of sufficient length to permit it to project from the body to effect the securing of the fixed contact arrangement in position. It is an object of the invention to provide a switch of the kind specified wherein these problems are minimised.

According to the invention in a stalk mounted switch of the kind specified the body comprises a hollow sleeve and a cap secured to the sleeve, and the electrical contacts comprise a fixed electrical contact carried at the free end of the stalk and a movable contact movable with the body and electrically connected to a lead extending through the hollow stalk, the sleeve being slidable freely on the stalk and having an internal diameter such, in relation to the dimensions of the stalk and fixed contact, that the sleeve could be disengaged from the free end of the stalk, and the bidy having therein an abutment component which co-operates with a second abutment component on the stalk and fixed contact assembly to prevent disengagement of the body from the free end of the stalk in the direction of the action of said resilient means.

Conveniently said abutment component is carried by said cap.

Preferably said cap also carries said movable contact.

Alternatively said abutment component is carried by a further part carried in said body.

Desirably said further part also carries said movable contact.

Desirably said resilient means urges said body to a position defined by said abutment components wherein said movable contact is spaced from the fixed contact.

One example of the invention is illustrated in the accompanying drawings, wherein.

Figure 1:
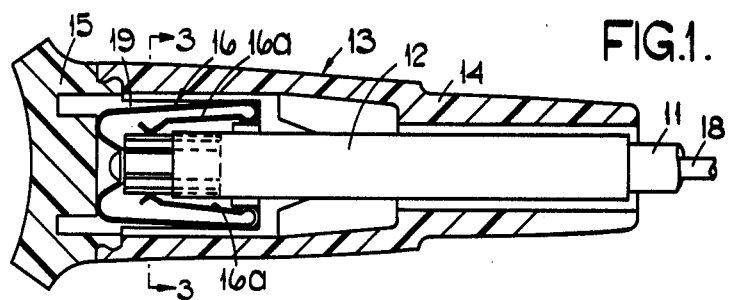
FIG. 1 is a longitudinal cross-sectional view of a stalk mounted electrical switch.
Figure 2:
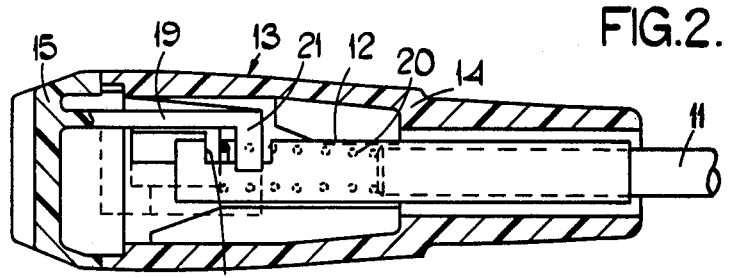
FIG. 2 is a view similar to FIG. 1 but at 90° to the plane of the section of FIG. 1.
Figure 3:
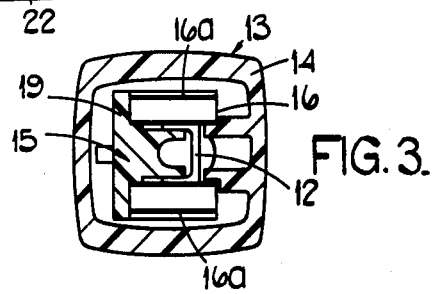
FIG. 3 is a sectional view on the line 3—3 in FIG. 1.
Figure 4:
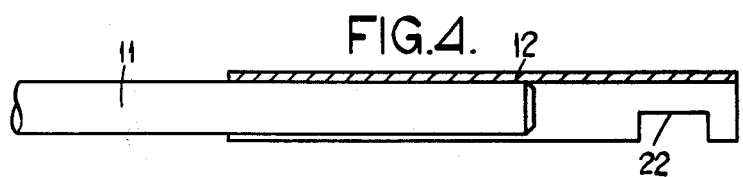
FIG. 4 is a side elevational view partly in section of part of the switch of FIG. 1.
Figure 5:
FIG. 5 is an end view of the part shown in FIG. 4.
Figure 6:
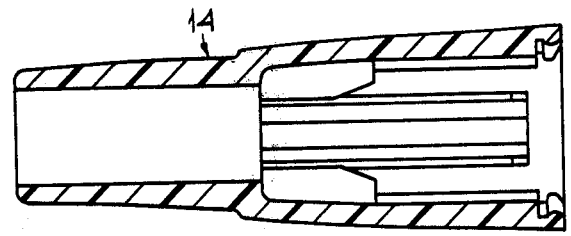
FIG. 6 is a sectional view of a sleeve part of the body of the switch shown in FIG. 1.
Figure 7:
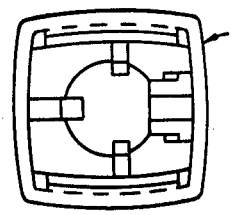
FIG. 7 is an end view of the sleeve part shown in FIG. 6.
Figure 8:
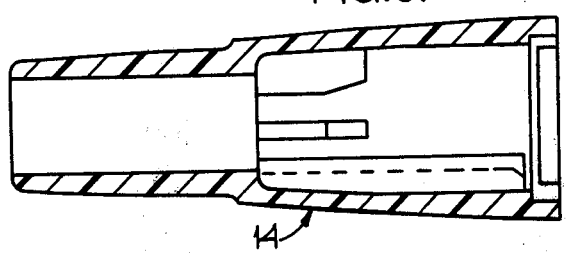
FIG. 8 is a further sectional view of the sleeve part of FIG. 6 but with the plane of the section at right angles to that of FIG. 6.
Figure 9:
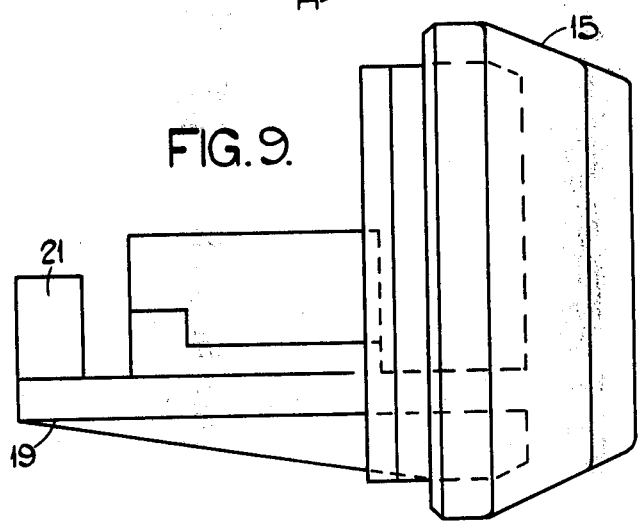
FIG. 9 is a side elevational view to an enlarged scale of a cap part of the body shown in FIG. 1.
Figure 10:
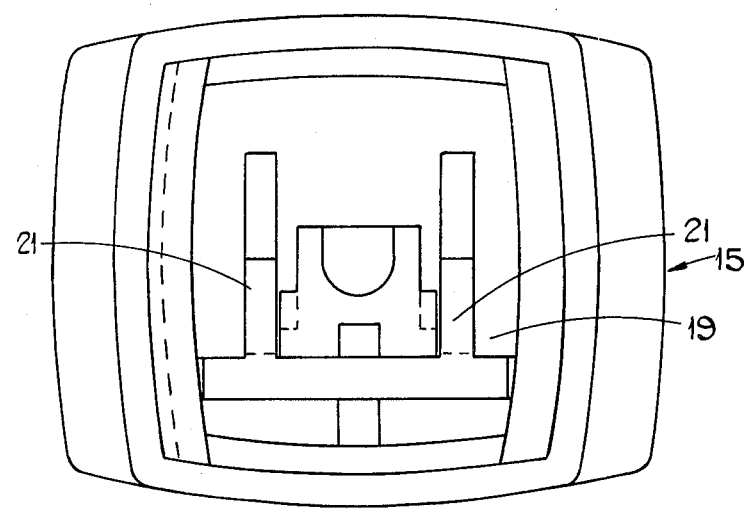
FIG. 10 is an end view of the cap of FIG. 9.
Figure 11:
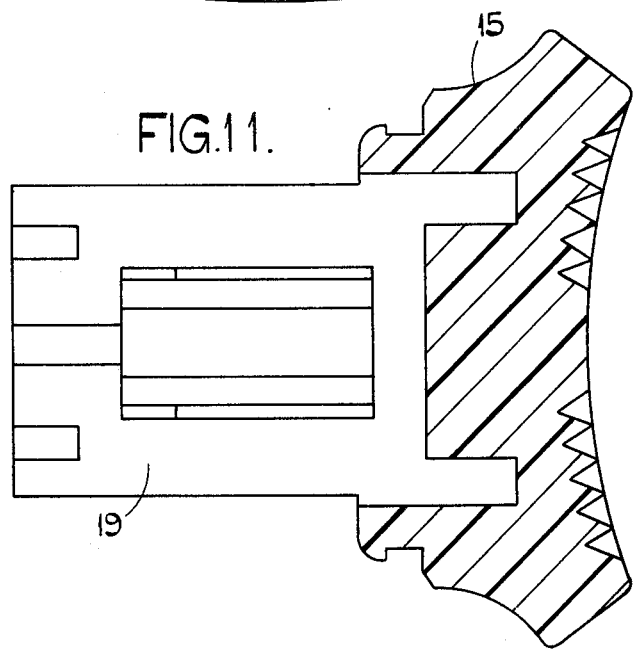
FIG. 11 is a sectional view of the cap of FIG. 9.

Referring first to FIGS. 1 to 11 of the drawings, the stalk mounted electrical switch comprises a hollow metal stalk 11 which in use constitutes the operating lever of a direction indicator switch of a road vehicle. At one end (not shown) the stalk 11 is rigidly secured to the rotor of the direction indicator switch, and the opposite, free end of the hollow metal stalk 11 has secured thereto a fixed contact member 12. The fixed contact member 12 is in the form of a metal channel within which the free end region of the stalk 11 is received. The member 12 and stalk 11 are interconnected for example, by welding to produce a rigid physical and electrical connection between them.

Slidably mounted on the free end region of the stalk 11 and receiving the free end region of the stalk 11 and the contact member 12 is a hollow two-part moulded synthetic resin body 13. The two parts of the body 13 are respectively a hollow sleeve 14 and an end cap 15 which in use closes the open end of the sleeve 14 remote from the stalk 11 and is received as a snap fit by the sleeve 14. A compression spring 20 lies within the channel section of the member 12 and at one end abuts the free end of the stalk 11. At its opposite end the spring abuts an internal projection of the cap 15 and thus the spring urges the body 13 longitudinally of the assembly of the stalk 11 and the fixed contact member 12 in a direction to move the cap 15 away from the free end of the stalk 11.

Disposed within the body 13 and carried by the cap 15 is a movable contact member 16 formed from phosphor-bronze strip. The contact member 16 is generally U-shaped with its two limbs extending on opposite sides respectively of the fixed contact member 12. At their ends remote from the base limb the two parallel limbs of the member 16 are bent back on themselves to define leaf-spring contact elements 16a integral with one another and extending within the U of the member 16 towards the base limb thereof. The inherent resilience of the member 16 urges the free ends of the leaf-spring contacts 16a towards one another so that the contacts 16a can engage the opposite outer faces of the fixed contact member 12. The cap 15 includes an integral extension within the sleeve 14 which is shaped to receive and retain the member 16 while permitting flexure of the leaf-spring contacts 16a thereof. A conductive lead 18 having an outer insulating sheath extends through the stalk 11 and is connected to the base limb of the member 16. Thus when the contacts 16a engage the fixed contact member 12 an electrical circuit is completed between the stalk 11 and the core of the lead 18.

The internal diameter of the sleeve 14 is such that the sleeve 14 can be assembled onto the stalk 11 over the fixed contact member 12. That is to say the sleeve can be threaded onto the stalk 11 from the free end thereof. In order to ensure that the body 13 is not completely displaced beyond the free end of the assembly of the stalk and fixed contact member under the action of the spring the cap 15 and the fixed contact member 12 are provided with mating abutment components which limit movement of the body 13 relative to the assembly of the stalk and fixed contact member under the action of the spring. The limit position of the relative movement is such that in the limit position the contacts 16a are axially spaced from the free end of the contact member 12 and thus the circuit between the stalk 11 and the lead 18 is broken.

The abutment components of the cap 15 and fixed contact member 12 are as follows. The cap 15 includes an integral projection 19 projecting into the sleeve 14 towards the stalk 11. At its free end the projection 19 includes a pair of integral lugs 21 which extend transversely of the axis of the assembly. The lugs 21 are received in respective elongate, longitudinally extending recesses 22 cut in the parallel walls of the channel section member 12. Thus the extent of the permitted sliding movement of the body 13 relative to the stalk 11 is determined by the difference between the length of the recesses 22 and the thickness of the lugs 21. Movement of the body 13 against the ation of the lugs is arrested but abutment of one face of the lungs 21 with the ends of the recesses 22 adjacent the free end of the stalk 11 and movement of the body 13 under the action of said spring being limited by abutment of the opposite faces of the lugs 21 with the ends of the recesses 22 remote from the free end of the stalk 11.

The stalk mounted electrical switch is assembled in the following manner. The fixed contact member 12 is first secured to the free end region of the stalk 11 which conveniently has already been secured, at its opposite end, to the rotor of the direction indicator switch. The sleeve 14 is then slipped over the member 12 and slid along the stalk 11 until the member 12 projects from the open end of the sleeve 14. Thereafter, the compression spring is located within the channel of the member 12 and the lead 18 is threaded through the hollow stalk 11 from the direction indicator switch rotor end of the stalk until the end of the lead 18 projects from the member 12. The projecting end of the lead is then physically and electrically secured to the base limb of the moving contact member 16 and the member 16 is then located in its recess in the cap 15. The lugs 21 of the cap 15 are next introduced into the recesses 22 of the member 12 it being understood that the angular orientation of the cap 15 relative to the member 12 which is necessary to introduce the lugs 21 into the recesses 22 automatically aligns the contacts 16a of the member 16 with the side walls of the member 12.

Lastly, the sleeve 11 is slid back along the length of the stalk 11 to encompass the fixed contact member 12 and the projection 19 of the cap 15 and the cap 15 is then pressed home into the open end of the sleeve 14 wherein it is retained as a snap-fit. The last stage of movement of the sleeve 14 relative to the cap lightly compresses the compression spring so that immediately upon assembly of the cap and sleeve to define the body 13 the compression spring urges the body and therefore the movable contact 16 to its outer limit position wherein the contacts 16a are axially spaced from the member 12.

Figure 12:
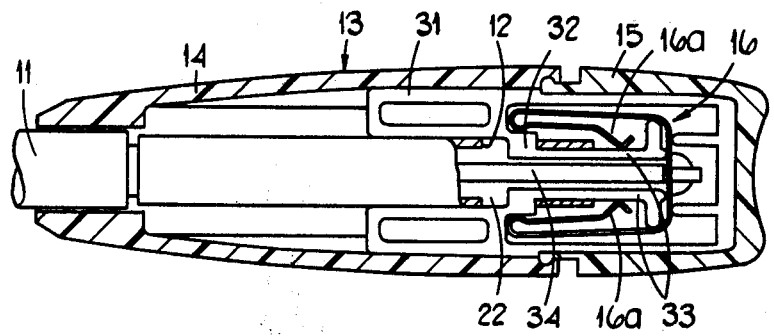
FIG. 12 is a view similar to FIG. 1 of a modification.
Figure 13:
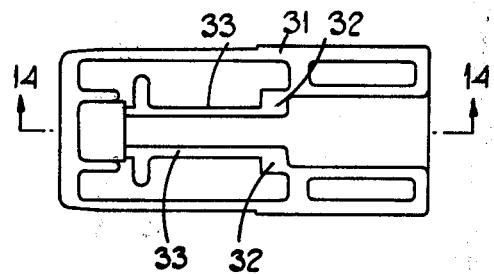
FIG. 13 is a plan view of a part of the assembly of FIG. 12.
Figure 14:
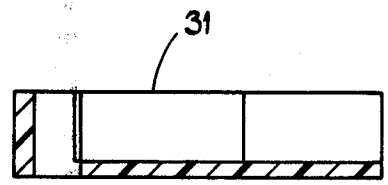
FIG. 14 is a sectional view on the line 14—14 of FIG. 13.

In the modification shown in FIGS. 12, 13 and 14 parts common to the arrangement described above carry the same reference numerals. Thus as with the previously described arrangement a two-part moulded synthetic resin body 13 is freely slidable on the free end region of a stalk 11, the body comprising a hollow sleeve 14 closed at its free end by a cap 15 receiving as a snap-fit in the sleeve 14. The free end of the stalk 11 carries a fixed contact member 12 of channel-shaped cross-section having recesses 22 cut in the parallel walls thereof.

The construction departs from the arrangement described above in that a moulded synthetic resin part 31 is trapped within the assembly defined by the sleeve 14 and the cap 15. The part 31 is in the form of a tray having a plurality of internal walls best seen in FIG. 13. The part 31 slidably receives the fixed contact member 12 of the stalk 11 and the part 31 includes a pair of transversely extending abutment walls 32 which extend through the recesses 22 of the fixed contact member 12. The longitudinal dimension of the walls 32 is less than the longitudinal dimension of the recess 22 and thus co-operation between the walls 32 and the ends of the recesses 22 determines the extent of longitudinal movement of the part 31 relative to the stalk 11. The internal walls of the part 31 are further shaped to locate and retain a movable contact member 16 similar to the movable contact member 16 on the previously described arrangement. As can clearly be seen in FIG. 12 the movable contact member 16 includes a pair of spring contacts 16a biassed towards one another by their own inherent resilience. A compression spring acts between the stalk 11 and the part 31 to urge the part 31 and thus the body 13 carrying the part 31 away from the stalk. This movement is of course limited by abutment of the walls 32 with one end of the recesses 22. In this rest position of the body 13 the contact regions of the leaf springs 16a engage walls 33 of the part 31. Thus in this rest position no electrical circuit is completed between the electrical lead 34 secured to the contact 16 and the stalk 11. However, it will be recognised that by moving the body 13 against the action of the compression spring the contact regions of the spring 16a are bought into engagement with the fixed contact member 12 thus completing an electrical circuit between the stalk 11 and the lead 34.

During assembly of the arrangement the sleeve 14 is first threaded over the free end of the stalk 11 and contact 12 and is moved to a position such that a connection can be made between the conductive core of the lead 34 and the movable contact member 16. The movable contact member 16 is then located within the confines of the part 31 and the part 31 is then introduced onto the fixed contact 12 in sliding engagement therewith. Lastly the sleeve 13 is moved back along the length of the stalk 11 to partly encompass the part 31 and the cap 15 is engaged with the sleeve 14 so as to trap the part 31 in position within te enclosure deined by the body 13. Thereafter of course the part 31 moves with the body 13 carrying the movable contact member 16 and providing in conjunction with the recesses 22, an abutment function preventing displacement of the body 13 from the free end of the stalk 11. As mentioned above the co-operation between the walls 32 and the ends of the recesses 22 limits movement of the body 13 relative to the stalk 11 in both longitudinal directions.

The stalk mounted electrical switches described above can be used to control various functions of the electrical circuit of a road vehicle. For example the switch can control operation of the horn, or the windscreen washers of the vehicle or could be used to control operation of a lighting relay of the vehicle. It will be appreciated that the rest condition of the switch is an off condition and depression of the body 13 towards the direction indicator switch engages the contacts 16 with the member 12 to complete the electrical circuit through the switch between the stalk 11 and the lead 18. Conveniently the exposed regions of the stalk 11 will be coated with an insulating material, or will be encased in an insulating sleeve.

It is to be understood that if desired the arrangement could be such that the switch is a normally closed switch, opened by manual movement of the body against the action of the spring.

It is to be further understood that while for convenience the stalk 11 of the stalk mounted switch has been described as the operating lever of a direction indicator switch the stalk could in fact, the the operating lever of for example a windscreen wiper control switch. Furthermore, the stalk 11 does not necessarily have to be the operating lever of a switch, and could for example be the operating lever of a mechanical hydraulic or pneumatic control device and the use of a stalk mounted switch is not restricted to automobile applications.

The constructions described above are more simple to manufacture than certain known arrangements which require a more complex fixed contact arrangement to be assembled at the end of the stalk subsequent to engagement of the sleeve over the stalk. The greater simplicity of manufacture afforded by the present constructions leads to the possibility of producing an arrangement with a shorter stalk than the conventional arrangement since the sleeve, when threaded over the stalk need not be moved to provide such great clearance at the end of the stalk as is required in the conventional arrangement. Furthermore, the present constructions afford an arrangement wherein a greater length of stalk is received within the sleeve in use and clearly therefore if desired, or if necessary a greater length of bearing area between the stalk and the sleeve can be provided in turn increasing the strength of the assembly to resist lateral loading.

I claim:

1. An electrical switch of the kind known as a stalk mounted switch, said switch comprising:
    an elongate, hollow stalk which defines the operating member of a further electrical switch;
    a hollow body slidable on the stalk lengthwise thereof;
    electrical contacts operable by movement of said hollow body relative to said stalk;
    resilient means urging said body longitudinally of said stalk in a direction to move said body to a free end of said stalk; and
    abutment means preventing the body from disengaging from said free end of said stalk under said urging of said resilient means, said body comprising a hollow sleeve and a cap secured to said sleeve, said electrical contacts comprising a fixed contact assembly carried at said free end of said stalk and a movable contact movable with said body, said movable contact being electrically connected to a conductive lead extending through said hollow stalk, and said sleeve being slidable on said stalk, said sleeve having an internal diameter such that said sleeve is disengageable from said free end of said stalk, said abutment means comprises a first abutment component within said body cooperating with a second abutment component on said stalk and fixed contact assembly, said second abutment component preventing disengagement of said body from said free end of said stalk in the direction of urging of said resilient means, said electrical lead being connected directly to said movable contact.

2. An electrical switch as claimed in claim 1 wherein said abutment component is carried by said cap.

3. An electrical switch as claimed in claim 2 wherein said cap also carries said movable contact.

4. An electrical switch as claimed in claim 1 wherein the first abutment is carried by a further part carried by said body.

5. An electrical switch as claimed in claim 4 wherein said further part also carries said movable contact.

6. An electrical switch as claimed in claim 1 wherein said resilient means urges said body to a position defined by said abutment components wherein said movable contact is spaced from said fixed contact.

* * * * *